(12) United States Patent
Nutzinger et al.

(10) Patent No.: US 11,609,079 B2
(45) Date of Patent: Mar. 21, 2023

(54) LENGTH MEASURING DEVICE

(71) Applicant: DR. JOHANNES HEIDENHAIN GmbH, Traunreut (DE)

(72) Inventors: Tarek Nutzinger, Vachendorf (DE); Hermann Meyer, Schneizlreuth (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 0 days.

(21) Appl. No.: 17/564,256

(22) Filed: Dec. 29, 2021

(65) Prior Publication Data

US 2022/0228847 A1 Jul. 21, 2022

(30) Foreign Application Priority Data

Jan. 18, 2021 (DE) .................... 10 2021 200 417.2

(51) Int. Cl.
  *G01B 5/02* (2006.01)
  *G01B 5/00* (2006.01)

(52) U.S. Cl.
  CPC ............. *G01B 5/0004* (2013.01); *G01B 5/02* (2013.01)

(58) Field of Classification Search
  CPC .................................. G01B 5/004; G01B 5/02
  USPC ......................................... 33/706, 707, 708
  See application file for complete search history.

(56) References Cited

U.S. PATENT DOCUMENTS

| | | | |
|---|---|---|---|
| 4,165,564 A | 8/1979 | Burkhardt | |
| 4,250,381 A | 2/1981 | Igarashi et al. | |
| 4,381,609 A * | 5/1983 | Holstein | G01B 21/02 33/708 |
| 4,509,262 A * | 4/1985 | Nelle | G01B 3/002 33/707 |
| 4,628,609 A * | 12/1986 | Rieder | G01D 5/2457 250/237 G |
| 4,951,399 A | 8/1990 | Ernst | |
| 5,010,655 A * | 4/1991 | Rieder | G01D 5/34784 250/237 G |
| 5,332,896 A * | 7/1994 | Holzapfel | G01D 5/366 250/237 G |

(Continued)

FOREIGN PATENT DOCUMENTS

DE 2929989 A1 2/1980
DE 3624485 A1 1/1988

(Continued)

*Primary Examiner* — George B Bennett
(74) *Attorney, Agent, or Firm* — Leydig, Voit & Mayer, Ltd.

(57) ABSTRACT

A length measuring device includes a carrier with a scale which extends longitudinally in a measuring direction. A scanning carriage for scanning a measuring graduation of the scale is longitudinally guided in the measuring direction, and, via a coupling, is rigidly coupled to a driver in the measuring direction and transversely thereto coupled to it in a flexible manner. The coupling includes a coupling element arranged between a first coupling point on the scanning carriage and a second coupling point on the driver. At the second coupling point, the coupling element is attached via a solid-body joint that is designed to carry the coupling element so as to be freely rotatable in relation to the driver about an axis of rotation which runs perpendicularly to a plane of the measuring graduation. The coupling element has a lower density than steel and/or a higher modulus of elasticity than steel.

15 Claims, 5 Drawing Sheets

(56) References Cited

U.S. PATENT DOCUMENTS

| | | | | |
|---|---|---|---|---|
| 5,551,163 | A * | 9/1996 | Affa | G01D 5/34761 33/702 |
| 5,992,969 | A * | 11/1999 | Arminana Terrasa | B41J 19/207 347/37 |
| 6,578,283 | B2 | 6/2003 | Nishi | |
| 6,769,195 | B2 * | 8/2004 | Huber | F16C 29/0633 33/708 |
| 7,127,824 | B2 * | 10/2006 | Mies | G01B 5/0009 356/616 |
| 7,253,609 | B2 * | 8/2007 | Schmidt | G01P 1/02 324/164 |
| 7,284,338 | B2 * | 10/2007 | Hager | G01D 11/305 33/708 |
| 7,596,880 | B2 * | 10/2009 | Martin | G01D 5/34761 250/237 G |
| 7,748,251 | B2 * | 7/2010 | Bernhard | G01B 21/22 73/1.79 |
| 7,856,734 | B2 | 12/2010 | Affa | |
| 8,341,852 | B2 * | 1/2013 | Bohm | G01D 5/2457 33/706 |
| 8,448,347 | B2 * | 5/2013 | Affa | G01D 5/34715 33/702 |
| 9,618,368 | B2 * | 4/2017 | Schlichtner | G01D 5/2457 |
| 10,234,277 | B2 | 3/2019 | Peterlechner | |
| 2011/0209352 | A1 * | 9/2011 | Affa | G01D 5/34715 33/706 |

FOREIGN PATENT DOCUMENTS

| | | |
|---|---|---|
| EP | 2037230 B1 | 8/2012 |
| EP | 1180662 B1 | 5/2013 |
| EP | 3228993 A1 | 10/2017 |

* cited by examiner

LENGTH MEASURING DEVICE

CROSS REFERENCE TO RELATED APPLICATIONS

This application claims benefit to German Patent Application No. DE 10 2021 200 417.2, filed on Jan. 18, 2021, which is hereby incorporated by reference herein.

FIELD

The present invention relates to a length measuring device.

BACKGROUND

Length measuring devices serve to measure lengths and paths and are used, especially in machine tools, for measuring the relative movement of a tool with respect to a workpiece to be processed, in coordinate measuring machines and increasingly also in the semiconductor industry.

EP 3 228 993 A1 discloses a length measuring device consisting of a scale and a scanning carriage scanning the scale. The scanning carriage is attached to a driver by means of a coupling, in the measuring direction rigidly, otherwise movably. The coupling comprises a connecting element which runs in the measuring direction and is rotatably mounted on a first swivel joint on the scanning carriage and on a second swivel joint on the driver. A first elastic means is provided between the connecting element and the driver, which elastic means exerts a pressing force on the scanning carriage and presses against a guide surface. Furthermore, a second elastic means is provided between the connecting element and the scanning carriage, which exerts a pressing force on the scanning carriage and also presses against the guide surface. The first elastic means is arranged at a distance from the second elastic means in the measuring direction.

Additional length measuring devices comprising a coupling are known from EP 2 037 230 B1, EP 1 180 662 B1, and DE 36 24 485 A1.

SUMMARY

In an embodiment, the present disclosure provides a length measuring device. The length measuring device has a carrier which extends longitudinally in a measuring direction and has a scale arranged thereon. The length measuring device also has a scanning carriage configured to scan a measuring graduation of the scale and is longitudinally guided on at least one guide surface in the measuring direction. The length measuring device further has a coupling via which the scanning carriage is rigidly coupled to a driver in the measuring direction and is coupled in a flexible manner to the driver transverse to the measuring direction. The coupling includes a coupling element which is arranged between a first coupling point on the scanning carriage and a second coupling point on the driver. At the second coupling point, the coupling element is attached to the driver via a solid-body joint that is designed to carry the coupling element so as to be freely rotatable in relation to the driver about a first axis of rotation which runs perpendicularly to a plane of the measuring graduation. The coupling element has a lower density than steel and/or a higher modulus of elasticity than steel.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
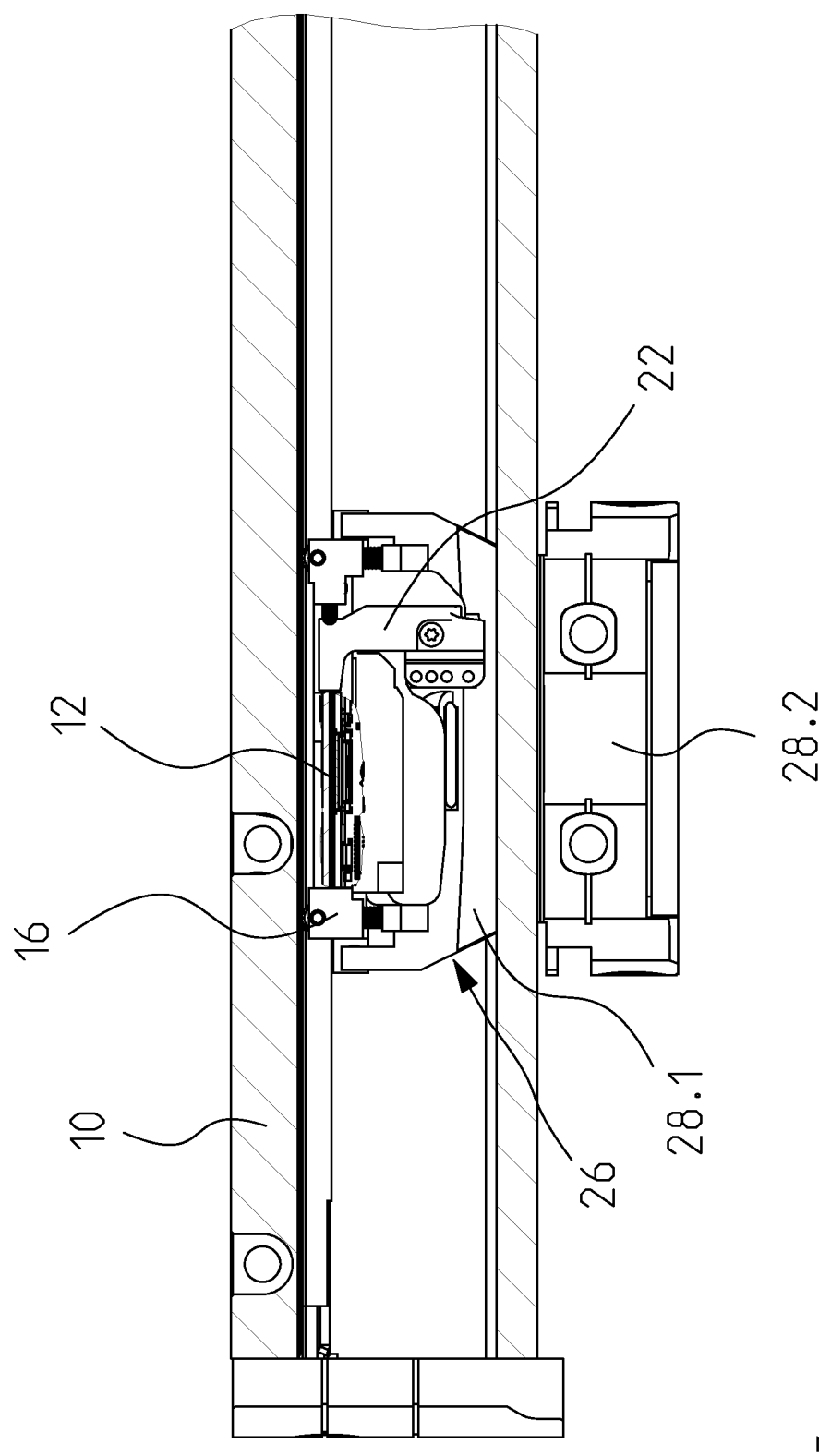
FIG. 1 a side view of a length measuring device according to one exemplary embodiment.

In an embodiment, the present invention provides a length measuring device which has a simple and compact design and with which precise position measurement is made possible.

The length measuring device designed according to an embodiment of the invention comprises a carrier which extends longitudinally in the measuring direction and has a scale arranged thereon, a scanning carriage for scanning a measuring graduation of the scale, wherein the scanning carriage is longitudinally guided on at least one guide surface, and a coupling via which the scanning carriage is rigidly coupled to a driver in the measuring direction and transversely thereto coupled to it in a flexible manner. The coupling comprises a coupling element which is arranged between a first coupling point on the scanning carriage and a second coupling point on the driver. The coupling element is attached to the driver at the second coupling point via a solid-body joint. The solid-body joint is designed to carry the coupling element so as to be freely rotatable in relation to the driver about a first axis of rotation, which runs perpendicularly to a plane of the measuring graduation. The coupling element has a lower density than steel and/or a higher modulus of elasticity than steel.

For example, the coupling element has a density in the range of 10 to 80%, in the range of 20 to 70%, or in the range of 25 to 65% of the density of steel.

For example, the coupling element has a modulus of elasticity in the range of 100 to 500 GPa, in the range of 160 to 440 GPa, or in the range of 250 to 350 GPa.

It is advantageous if the coupling comprises a ball via which the coupling element is coupled to the scanning carriage at the first coupling point, if the coupling element comprises a receiving region for receiving the ball, and if the receiving region is free of a stop pin and/or a pin for a ball support and is designed in such a way that the ball is movable in a direction perpendicular to the measuring direction.

Furthermore, it is advantageous if the coupling comprises a plate-shaped element for connecting the solid-body joint to the coupling element, and if the coupling element has a plurality of pin-shaped elements which extend at least partially through respectively associated openings of the plate-shaped element.

The coupling element preferably consists largely or completely of ceramics.

Alternatively, the coupling element can consist largely or completely of carbon-fiber-reinforced plastic (CFRP).

The solid-body joint is especially a leaf spring.

Embodiments of the invention achieve a relatively high inherent rigidity on the one hand and a relatively low mass of the coupling element on the other hand. As a result, the position of the frequency band of the natural frequency of the system can be significantly shifted in the direction of higher frequencies. This in turn enables an improved frequency behavior of the length measuring device in comparison to the prior art. In addition, an (additional) mass spring system for realizing the coupling, the natural frequencies of which lead to a significant deterioration in the measuring accuracy in specific frequency bands, can be dispensed with. On the one hand, a simple and compact design is thus achieved, and on the other hand, precise position measurement is made possible.

Further details and advantages of embodiments of the present invention are explained with reference to the following description of possible exemplary embodiments of the invention in conjunction with the figures.

Identical elements or functionally identical elements are provided with the same reference signs in the figures.

Figure 6:
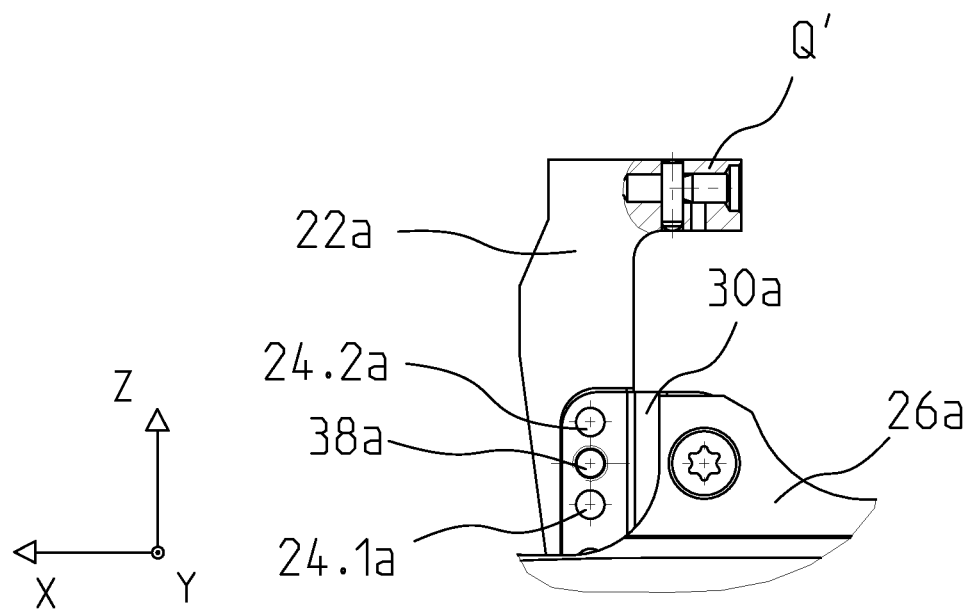
FIG. 6 a side view of a coupling element of a length measuring device according to the prior art.
Figure 7:
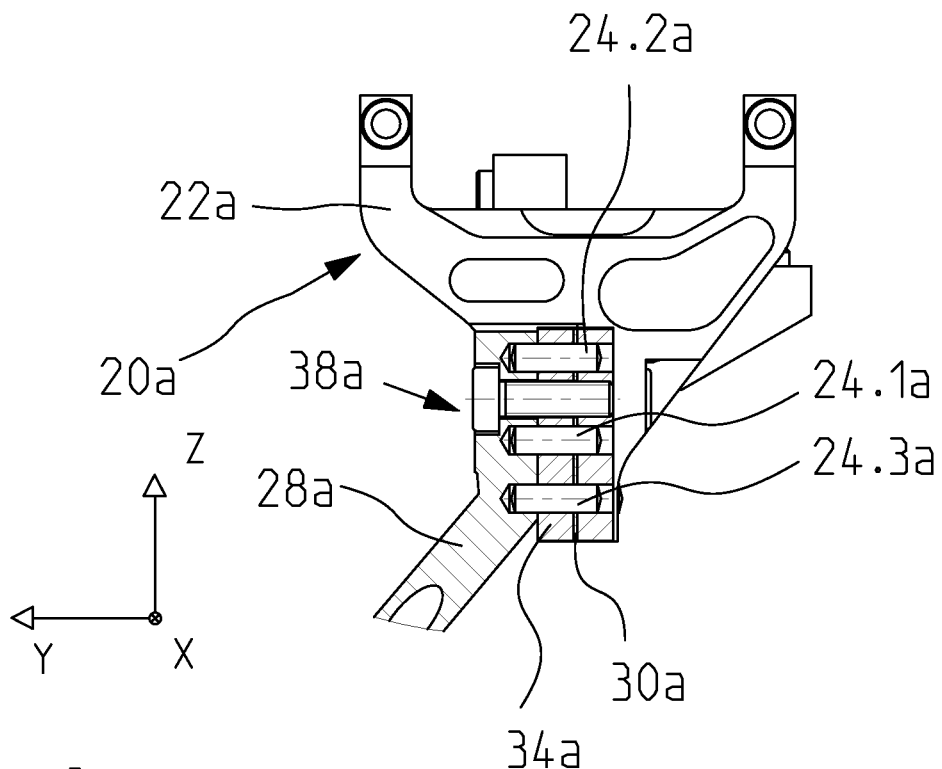
FIG. 7 a further side view of the coupling element of the length measuring device according to the prior art for illustrating a connection of a solid-body joint to the coupling element.
Figure 8:
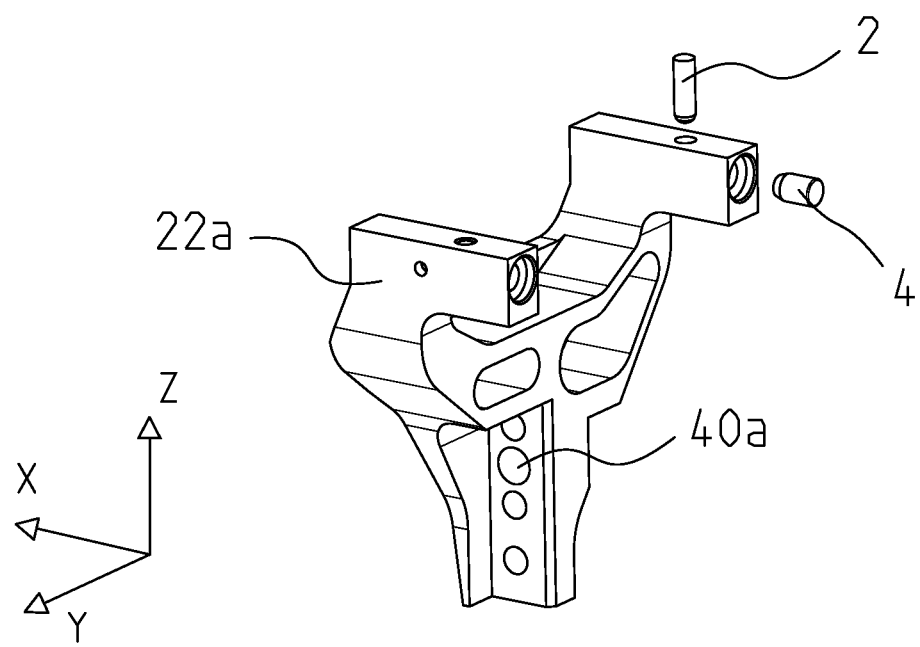
FIG. 8 a perspective view of the coupling element of the length measuring device according to the prior art with a stop pin and a pin for a ball support.

An exemplary embodiment is explained below using FIGS. 1 to 5. FIGS. 6 to 8 show components (elements) of a known length measuring device. The length measuring device according to the exemplary embodiment serves to measure the relative position of two objects that are displaceable in relation to one another in the measuring direction X. For position measurement, a scale 12 of the length measuring device is attached to one of these objects and a scanning carriage 16 of the length measuring device is attached to the other of these objects. The scale 12 is scanned by the scanning carriage 16 that is movable in relation to the scale 12 in the measuring direction X. The length measuring device has a carrier 10 extending longitudinally in the measuring direction X. The scale 12 has a measuring graduation 14 which is scanned by the scanning carriage 16. For this purpose, the scanning carriage 16 comprises an illumination unit which emits a beam of light that is modulated in a position-dependent manner by the measuring graduation 14 and eventually hits light-sensitive scanning sensors of the scanning carriage 16.

Figure 2:
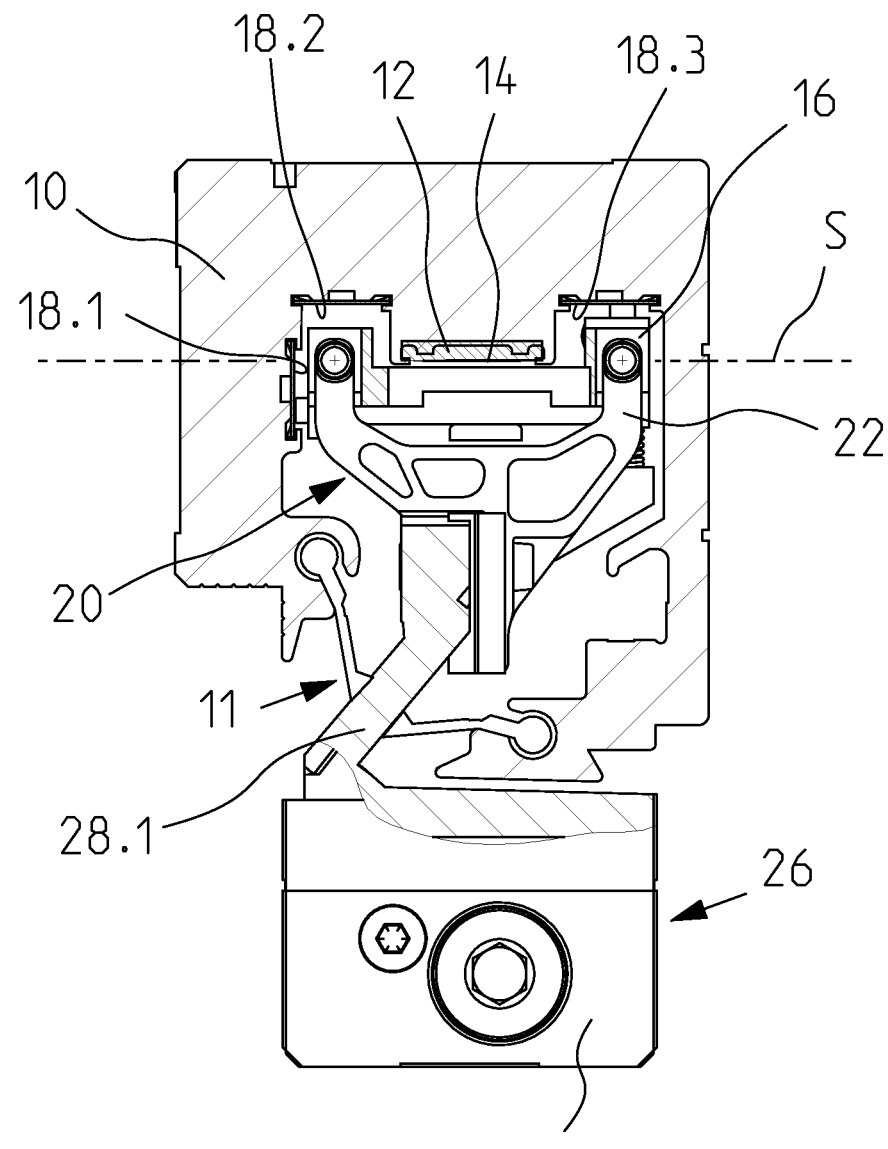
FIG. 2 a cross-section of the length measuring device according to FIG. 1 in the region of the coupling element.

The scale 12 is arranged on the carrier 10. As shown in FIG. 2, the carrier 10 is a hollow profile in which the scale 12 and the scanning carriage 16 are accommodated in a protected manner. The scale 12 is connected to the carrier 10 in a known manner, for example by gluing or clamping. In its longitudinal direction running in the measuring direction X, the carrier 10, designed as a hollow profile, has a slot closed by sealing lips 11 which are inclined in the shape of a roof and through which a driver 26 having a sword-shaped middle piece 28.1 passes. The driver 26 has an assembly region 28.2 by means of which it can be attached to one of the objects to be measured, for example a carriage of a machine tool.

For exact parallel guidance, the scanning carriage 16 is guided along the scale 12 thereof and/or on the carrier 10. In the exemplary embodiment shown, the scanning carriage 16 is supported for this purpose via guide elements on a plurality of guide surfaces 18.1 to 18.3. The guide surfaces 18.1 to 18.3 are formed by guide bands attached to the carrier 10. The guide surfaces 18.2, 18.3 are aligned in parallel to a plane S of the measuring graduation 14. The guide surface 18.1 is aligned perpendicularly to this plane S. The guide elements can be slide elements but especially ball-bearing-mounted rollers or rolls.

The scanning carriage 16 is rigidly coupled to the driver 26 via a coupling 20 in the measuring direction X and transversely thereto coupled to it in a flexible manner. The coupling 20 comprises a coupling element 22, which is arranged between a first coupling point P1 on the scanning carriage 16 and a second coupling point P2 on the driver 26 (see FIG. 3). The coupling element 22 is attached to the driver 26 at the second coupling point P2 via a solid-body joint 30, especially a leaf spring. The solid-body joint 30 is designed to carry the coupling element 22 so as to be freely rotatable in relation to the driver 26 about a first axis of rotation R1 which runs perpendicularly to the plane S of the measuring graduation 14. The leaf spring is made especially of steel.

The coupling element 22 has a lower density than steel and/or a higher modulus of elasticity than steel. For example, the coupling element 22 has a density in the range of 10 to 80%, in the range of 20 to 70%, or in the range of 25 to 65% of the density of steel. Furthermore, the coupling element 22 has, for example, a modulus of elasticity in the range of 100 to 500 GPa, in the range of 160 to 440 GPa, or in the range of 250 to 350 GPa. In the exemplary embodiment shown, the coupling element 22 consists largely or preferably completely of ceramics.

Figure 3:
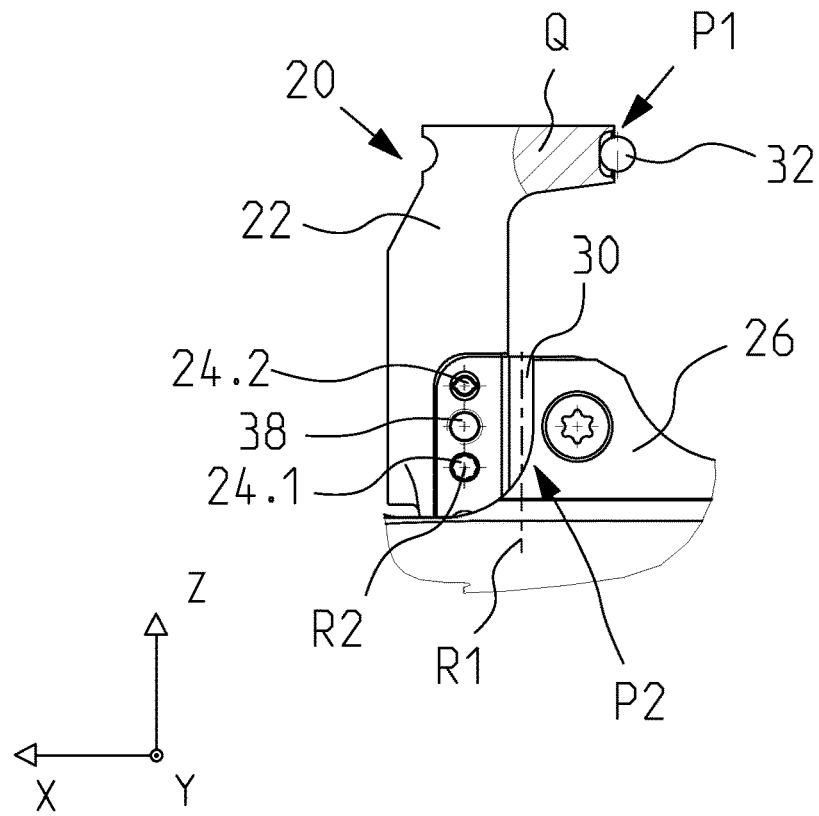
FIG. 3 a side view of the coupling element of the length measuring device according to FIG. 1.

With reference to FIG. 3, the coupling element 22 is designed to be substantially L-shaped. Furthermore, the coupling element 22 has a fork-shaped design, wherein upper sections of the coupling element 22 are arranged on both sides of the measuring graduation 14 (see FIG. 2). The coupling element 22 extends between the first and second coupling points P1, P2. The first coupling point P1 and the second coupling point P2 are arranged offset in relation to one another in a direction Z, which runs perpendicularly to the plane S of the measuring graduation 14.

The first coupling point P1 is preferably arranged on the one hand in the plane S of the measuring graduation 14 or at least close to this plane S (in the Z direction) and on the other hand on both sides of the measuring graduation 14 (in the Y direction). This is illustrated especially in FIG. 2.

The coupling 20 shown in FIG. 3 comprises a ball 32 via which the coupling element 22 is coupled to the scanning carriage 16 at the first coupling point P1. The coupling element 22 comprises a receiving region Q for receiving the ball 32. In contrast to the prior art, the receiving region Q is free of a stop pin and/or a pin for a ball support and is designed in such a way that the ball 32 is movable in a direction perpendicular to the measuring direction X (i.e., in the YZ plane). For this purpose, at least the receiving region Q should have ceramics.

The coupling to the first coupling point P1 explained with reference to FIG. 3 makes it possible to dispense with the use of a stop pin or a pin for a ball support (see elements 2 and 4 in FIG. 8). This makes it possible to save considerable costs in the production of the length measuring device in comparison to the prior art.

Figure 4:
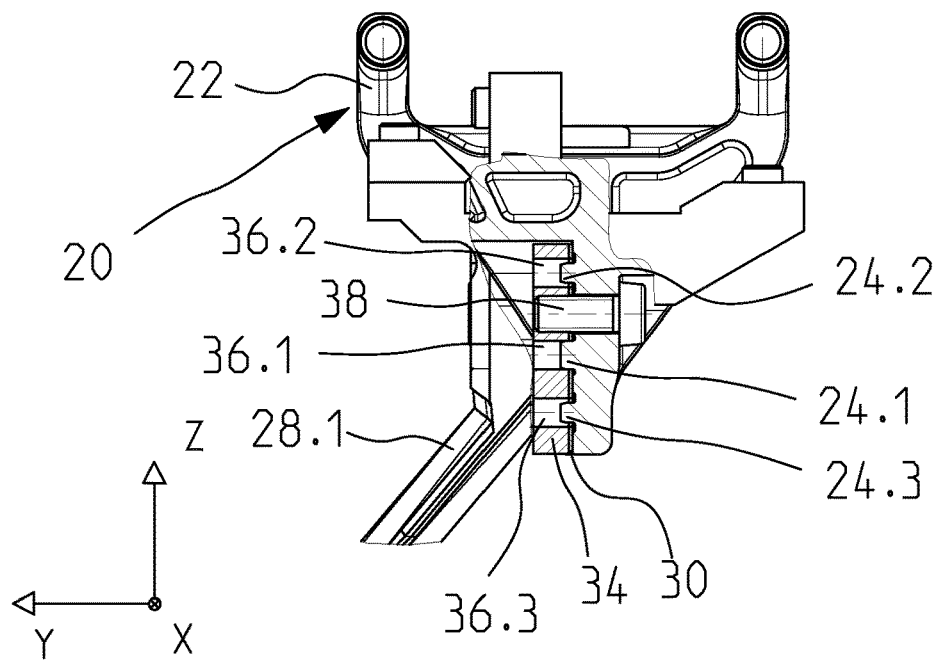
FIG. 4 a further side view of the coupling element of the length measuring device according to FIG. 1 for illustrating a connection of the solid-body joint to the coupling element.

With reference to FIG. 4, the coupling 20 comprises a plate-shaped element 34, especially a steel plate, for connecting the solid-body joint 30 to the coupling element 22. The plate-shaped member 34 is formed to be substantially rectangular when viewed in the direction of the Y-axis. The coupling element 22 has a plurality of pin-shaped elements 24.1 to 24.3 which extend at least partially through the respectively associated openings 36.1 to 36.3 of the plate-shaped element 34. FIG. 4 shows the connected state of the solid-body joint 30. In the connected state, the solid-body joint 30 is arranged between the plate-shaped element 34 and a region opposite thereto (see region A in FIG. 5) of the coupling element 22. Furthermore, in the connected state, the plate-shaped element 34 is attached to the coupling element 22 via a screw 38.

Figure 5:
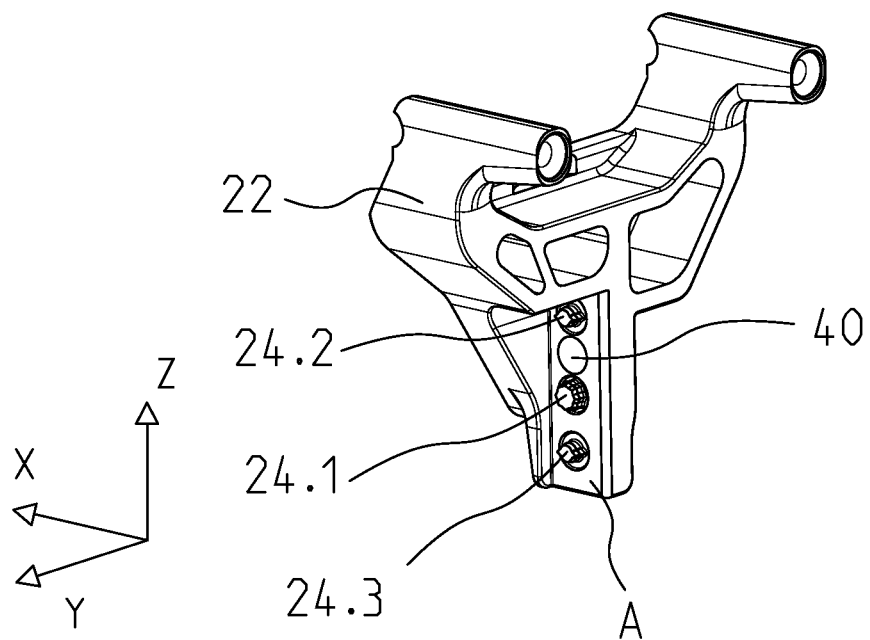
FIG. 5 a perspective view of the coupling element of the length measuring device according to FIG. 1.

With reference to FIG. 5, the coupling element 22 has a first to third pin-shaped element 24.1 to 24.3. The pin-shaped elements 24.1 through 24.3 are arranged one above the other in the Z direction. The first pin-shaped element 24.1 is star-shaped in order to position the plate-shaped element 34 over an opening 36.1 (bore) of the plate-shaped element 34 associated with the first pin-shaped element 24.1. The second and third pin-shaped elements 24.2, 24.3 rest on both sides against the edge of an opening 36.2, 36.3 (bore) respectively associated with the second and third pin-shaped elements 24.2, 24.3 in order to prevent rotation of the plate-shaped element 34 about a second axis of rotation R2, which runs in a direction Y parallel to the plane S of the measuring graduation 14 (see FIG. 3), and to compensate for a distance tolerance (substantially in the Z direction).

As shown in FIG. 5, the first pin-shaped element 24.1 is designed in such a way that it can rest against the edge of the opening 36.1 substantially over its entire circumference. Furthermore, the second and third pin-shaped elements 24.2, 24.3 are each designed in such a way that they rest against the edge of the openings 36.2 and 36.3, respectively, at two opposite points in the X direction. In the Z direction, however, the second and third pin-shaped elements 24.2, 24.3 do not rest against the edges of the two openings 36.2, 36.3.

FIG. 5 also shows an opening 40 arranged between the first and second pin-shaped elements 24.1, 24.2. The opening 40 serves to receive the screw 38 (see FIG. 4).

The function described in connection with FIG. 5 is also achieved if one of the two pin-shaped elements 24.2, 24.3 is omitted.

With reference to FIG. 5, the second and third pin-shaped elements 24.2, 24.3 are arranged on opposite sides of the opening 40 or on opposite sides of the first pin-shaped element 24.1.

Advantageously, the pin-shaped elements 24.1 to 24.3 are elements manufactured by integral molding onto the region A of the coupling element 22 that faces the plate-shaped element 34. This eliminates the need for pressing in pins that are required in the prior art for connecting the solid-body joint 30a to the coupling element 22a (see elements 24.1a to 24.3a in FIG. 7). In order to achieve an improved (or robust) coupling of the coupling element 22 to the second coupling point P2, at least the pin-shaped elements 24.1 to 24.3 should have ceramics as well.

In FIGS. 6 to 8, corresponding or analogous elements are provided with the same reference signs as in FIGS. 1 to 5 but together with the letter a or with the same reference signs as in FIGS. 1 to 5 with a prime.

The use of ceramics for the majority (or main portion) of the coupling element enables a high hardness and excellent surface quality thereof at least at the first and second coupling points P1, P2.

The measuring graduation 14 can be an incremental graduation. Alternatively, the measuring graduation 14 can also be an absolute graduation, for example designed as a pseudo-random code.

Embodiments of the invention enable especially high-resolution position measurement if the measuring graduation 14 is designed to be optically scannable. The measuring graduation 14 may alternatively also be designed to be magnetically, inductively, or capacitively scannable.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A length measuring device comprising:
    a carrier which extends longitudinally in a measuring direction and has a scale arranged thereon;
    a scanning carriage configured to scan a measuring graduation of the scale, the scanning carriage being longitudinally guided on at least one guide surface in the measuring direction; and
    a coupling via which the scanning carriage is rigidly coupled to a driver in the measuring direction and is coupled in a flexible manner to the driver transverse to the measuring direction, the coupling comprising a coupling element which is arranged between a first coupling point on the scanning carriage and a second coupling point on the driver,
    wherein, at the second coupling point, the coupling element is attached to the driver via a solid-body joint that is designed to carry the coupling element so as to be freely rotatable in relation to the driver about a first axis of rotation which runs perpendicularly to a plane of the measuring graduation, and
    wherein the coupling element has a lower density than steel and/or a higher modulus of elasticity than steel.

2. The length measuring device according to claim 1, wherein the coupling element has a density in a range of 10 to 80%, in a range of 20 to 70%, or in a range of 25 to 65% of the density of steel.

3. The length measuring device according to claim 1, wherein the coupling element has a modulus of elasticity in a range of 100 to 500 GPa, in a range of 160 to 440 GPa, or in a range of 250 to 350 GPa.

4. The length measuring device according to claim 1, wherein the coupling element has an L-shaped design.

5. The length measuring device according to claim 1, wherein the first coupling point and the second coupling point are arranged offset in relation to one another in a direction perpendicular to the plane of the measuring graduation.

6. The length measuring device according to claim 1, wherein the coupling comprises a ball via which the coupling element is coupled to the scanning carriage at the first coupling point, wherein the coupling element comprises a receiving region configured to receive the ball, and wherein the receiving region is free of a stop pin and/or a pin for a ball support and is designed in such a way that the ball is movable in a direction perpendicular to the measuring direction.

7. The length measuring device according to claim 6, wherein at least the receiving region has ceramics.

8. The length measuring device according to claim 1, wherein the coupling comprises a plate-shaped element designed to connect the solid-body joint to the coupling element, and wherein the coupling element has a plurality of pin-shaped elements which extend at least partially through respectively associated openings of the plate-shaped element.

9. The length measuring device according to claim 8, wherein the pin-shaped elements include at least a first and second pin-shaped element arranged one above the other in a direction perpendicular to the plane of the measuring graduation, wherein the first pin-shaped element is star-shaped so as to position the plate-shaped element via an opening of the plate-shaped element associated with the first pin-shaped element, wherein the second pin-shaped element rests on both sides against the edge of an opening associated with the second pin-shaped element so as to prevent rotation of the plate-shaped element about a second axis of rotation, which runs in a direction parallel to the plane of the measuring graduation, and to compensate for a distance tolerance.

10. The length measuring device according to claim 8, wherein the pin-shaped elements are elements manufactured by integral molding onto a region of the coupling element facing the plate-shaped element.

11. The length measuring device according to claim 8, wherein at least the pin-shaped elements have ceramics.

12. The length measuring device according to claim 8, wherein the plate-shaped element is a steel plate.

13. The length measuring device according to claim 1, wherein the coupling element consists largely or completely of ceramics.

14. The length measuring device according to claim 1, wherein the solid-body joint is a leaf spring.

15. The length measuring device according to claim 14, wherein the leaf spring is made of steel.

* * * * *